(12) United States Patent
Jiang

(10) Patent No.: US 8,500,880 B2
(45) Date of Patent: Aug. 6, 2013

(54) AMINO ACID SALT ARTICLES AND METHODS OF MAKING AND USING THEM

(75) Inventor: Dayue David Jiang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 648 days.

(21) Appl. No.: 12/624,841

(22) Filed: Nov. 24, 2009

(65) Prior Publication Data

US 2011/0120305 A1    May 26, 2011

(51) Int. Cl.
*B01D 53/02*    (2006.01)

(52) U.S. Cl.
USPC ............ 96/118; 95/91; 562/400; 427/372.2

(58) Field of Classification Search
USPC ............ 95/91; 96/118; 562/400; 437/372.2
See application file for complete search history.

(56) References Cited

U.S. PATENT DOCUMENTS

| | | | |
|---|---|---|---|
| 3,232,033 A * | 2/1966 | Williston et al. | 96/152 |
| 3,532,637 A | 10/1970 | Zeff et al. | 252/190 |
| 4,181,513 A * | 1/1980 | Fukuda et al. | 96/153 |
| 5,409,769 A | 4/1995 | Fukumoto et al. | 428/304.4 |
| 5,518,977 A * | 5/1996 | Dunne et al. | 502/68 |
| 5,603,927 A | 2/1997 | Fukumoto et al. | 424/76.1 |
| 5,611,843 A | 3/1997 | Ho | 95/51 |
| 5,620,940 A | 4/1997 | Birbara et al. | 502/402 |
| 6,099,621 A | 8/2000 | Ho | 95/139 |
| 6,171,372 B1 | 1/2001 | Ichiki et al. | 95/129 |
| 6,547,854 B1 | 4/2003 | Gray et al. | 95/139 |
| 6,908,497 B1 | 6/2005 | Sirwardane | 95/136 |
| 7,288,136 B1 | 10/2007 | Gray et al. | 95/139 |
| 2004/0217049 A1 * | 11/2004 | Bayer et al. | 210/500.36 |
| 2008/0125314 A1 | 5/2008 | Shim et al. | 502/401 |
| 2010/0300289 A1 * | 12/2010 | Jiang | 95/136 |
| 2011/0120306 A1 * | 5/2011 | Jiang | 95/91 |

FOREIGN PATENT DOCUMENTS

| | | |
|---|---|---|
| JP | 2007/319041 | 12/2007 |
| WO | 03/095071 | 11/2003 |
| WO | 2005/108297 | 11/2005 |
| WO | 2008/099604 | 8/2008 |

OTHER PUBLICATIONS

Hamborg et al Article, "Dissociation Constants and Thermodynamic Properties of Amino Acids Used in CO2 Absorption from (293 to 353)K"; J. Chem. Eng. Data, 2007; 52(b), pp. 2491-2502.
Singh et al Article, "Structure and activity relationships for CO2 regeneration from aqueous amine-based absorbents" , 2008.
Portugal et al Article; "Characterization of potassium glycinate for carbon dioxide absorption purposes"; Chemical Engineering Science 62 (2007), 6534-6547.
Van Holst et al Article; "Kinetic study of CO2 with various amino acid salts in aqueous solution"; Chemical Engineering Science 64 (2009) 59-68.
English Translated Abstract of JP2007/319041, published Dec. 13, 2007.

* cited by examiner

*Primary Examiner* — Christopher P Jones
(74) *Attorney, Agent, or Firm* — Susan S. Wilks

(57) ABSTRACT

An article comprising a substrate; and an amino acid salt disposed on the substrate. The article may be useful, for example, in the removal of an acid gas component from a gas.

10 Claims, No Drawings

AMINO ACID SALT ARTICLES AND METHODS OF MAKING AND USING THEM

FIELD OF THE DISCLOSURE

This disclosure relates to amino acid salt articles useful, for example, for the removal of an acid gas component from a gas.

BACKGROUND $CO_2$ has been claimed to be the primary source in global warming (the green house effect). Many industrial processes, such as coal gasification, biomass gasification, steam reforming of hydrocarbons, partial oxidation of natural gas, and like processes, produce a great amount of $CO_2$, $H_2S$ and other acidic gas containing gas streams. It is therefore desirable to remove and/or capture $CO_2$ and/or $H_2S$ and other acidic gases from those gas mixtures.

SUMMARY

The present inventor has now developed new articles useful, for example, for the removal of acid gas components, such as $CO_2$ from a gas. An exemplary article comprises an inorganic substrate and a particulate solid amino acid salt disposed on the inorganic substrate.

The articles described herein may be useful, for example, in the removal of an acid gas component from a gas. One exemplary method comprises providing an article comprising a substrate and a solid consisting essentially of an amino acid salt disposed on the substrate; and contacting a gas comprising an acid gas component with the article to remove at least a portion of the acid gas component from the gas. Another exemplary method comprises contacting a gas comprising an acid gas component with a solid particulate amino acid salt to remove at least a portion of the acid gas component from the gas.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

DETAILED DESCRIPTION

One embodiment is an article comprising an inorganic substrate and a particulate solid amino acid salt disposed on the inorganic substrate. In some embodiments, the inorganic substrate comprises a glass or ceramic. The substrate may be porous or non-porous. The substrate may be in any appropriate form. In one embodiment, the substrate is in the form of fibrous material such as a glass wool. In another embodiment, the substrate is in the form of a flow-through substrate, such as a ceramic honeycomb. In other embodiments, the substrate is substantially planar, such as in the form of a plate.

The term "flow-through substrate" as used herein means a shaped body comprising inner passageways, such as straight or serpentine channels and/or porous networks that would permit the flow of a gas through the body. The flow-through substrate comprises a dimension in the flow-through direction of, for example, at least 1 cm, at least 2 cm, at least 3 cm, at least 4 cm, at least 5 cm, at least 6 cm, at least 7 cm, at least 8 cm, at least 9 cm, or at least 10 cm from the inlet to the outlet.

In one embodiment, the flow-through substrate has a honeycomb structure comprising an inlet end, an outlet end, and inner channels extending from the inlet end to the outlet end. In one embodiment, the honeycomb comprises a multiplicity of cells extending from the inlet end to the outlet end, the cells being defined by intersecting cell walls. The honeycomb substrate could optionally comprise one or more selectively plugged honeycomb substrate cell ends to provide a wall flow-through structure that allows for more intimate contact between the gas and cell walls.

The amino acid salt is a salt derived from an amino acid. The amino acid salt may be derived, for instance, from glycine, arginine, lysine, histidine, 6-aminohexanoic acid, proline, sarcosine, methionine, or taurine. Poly (amino-acids), for example, polyarginine, polylysine, polyonithine, or polyhistidine may also be used to prepare the amino acid salt. In one embodiment, the amino acid salt is an amino acid potassium salt, prepared via reaction between potassium hydroxide in solution and an amino acid. In another embodiment, the amino acid salt is an amino acid sodium salt, prepared via reaction between sodium hydroxide in solution and an amino acid.

A "particulate" amino acid salt is one that exists in the form of a particle. Exemplary particle sizes of the amino acid salt include median or mean particle sizes of 5 mm or less, 1 mm or less, 10 µm or less, 5 µm or less, 3 µm or less, or 1 µm or less.

Another embodiment is a method of making an article comprising an inorganic substrate and a particulate solid amino acid salt disposed on the inorganic substrate which comprises providing an inorganic substrate; applying an amino acid salt solution to the inorganic substrate to form a coated substrate; and drying the coated substrate. In this method, the inorganic substrate and particulate solid amino acid salt may be selected, for instance, from the inorganic substrates and particulate solid amino acid salts described above.

The solid amino acid salt particulates in this method form a coating on the substrate. The term "coating" as used herein means that particulate solid amino acid salt is disposed on an exposed surface of the substrate. The coating may coat all or a portion of the surface of the substrate, and may impregnate the substrate to any extent if the surface of the substrate is porous.

The amino acid salt solution may be prepared, for example, by mixing an amino acid and a solution of potassium hydroxide in any molar ration, such as at a molar ratio of about 1:1 COOH to OH in a solvent, such as, water. The pH of the resulting solution can be adjusted using the potassium hydroxide solution and/or the amino acid to fall within the range of 8 to 14. In some embodiments sodium hydroxide can be used instead of potassium hydroxide.

The amino acid salt solution may be applied to the substrate in any suitable manner, for example, spraying or dipping. In some embodiments, a substrate is submerged in the amino acid salt solution for any appropriate length of time, such as, 10-15 seconds. The coated substrate is then allowed to dry at room temperature. The coated substrate may also be dried in a heated environment, for example, an oven. It is during the drying process that the solid amino acid salt particulates are formed on the substrate. A complete evaporation of water during the drying process is not required.

An article including any combination of the embodiments described above may be used in a method including contacting a gas comprising an acid gas component with the article to remove at least a portion of the acid gas component from the gas. One embodiment is a method comprising contacting a gas comprising an acid gas component with an article comprising an inorganic substrate and a particulate solid amino acid salt disposed on the inorganic substrate; to remove at least a portion of the acid gas component from the fluid. The gas may be in the form of a gas or a gas mixture. The gas or gas mixture may also contain another phase, such as a solid particulate in either a gas or liquid, or droplets of liquid in a gas. Contacting the gas with the article may be done by, for example, passing a stream of the gas across an external surface of the article, or passing a stream of gas through an internal volume of the article.

An acid gas is one that, when dissolved in a solvent, leads to a solution with a pH less than 7. Exemplary acid gases include $H_2S$ and $CO_2$. The acid gas component may be present in the gas being treated in any proportion. The acid gas may be removed from the fluid via adsorption, absorption, or other entrapment of the acid gas on the article, either physically, chemically, or both physically and chemically. At least a portion of the acid gas component is removed from the gas, for example, some, or all of the acid gas. In some embodiments, the article removes at least 5%, at least 10%, at least 20%, at least 50%, at least 70%, or at least 90% of the acid gas component from the gas. In some embodiments, $H_2S$ is removed from the fluid. In other embodiments, $CO_2$ is removed from the fluid. The article is capable of capturing the acid gas component in a humidified or dry environment.

Another embodiment is a method comprising providing an article comprising a substrate and an active solid consisting of an amino acid salt disposed on the substrate; and contacting a gas comprising an acid gas component with the article to remove at least a portion of the acid gas component from the gas. As used herein, an "active" solid is one that would promote the capture of an acid gas in contact with the article. The article may include any appropriate inactive (e.g. inert) materials in addition to the active solid. The substrate and amino salt may be selected from the substrates and amino acid salts described previously. The substrate may alternatively comprise organic materials, for example, lignocellular material (e.g. wood powder) or polymer (e.g. polymeric foam).

Another embodiment is a method comprising contacting a fluid comprising an acid gas component with a solid particulate amino acid salt to remove at least a portion of the acid gas component from the gas. For example, the solid particulate amino acid salt may be used to remove an acid gas component from a gas without the use of a substrate, or with the particulate amino acid salt disposed on an inorganic or organic substrate, including any of the substrates mentioned above. The solid particulate amino acid salt may optionally be formed into a shaped article with or without the addition of a binder. Examples of such shaped articles include pellets or flow-through substrates. The amino acid salt may be selected from the amino acid salts described previously. The solid particulate amino acid salt may be prepared by any suitable technique, such as by precipitating it from an amino acid salt solution.

Further embodiments comprise regenerating any of the above-described articles or particulate amino acid salts by removing at least a portion of the acid gas from the article or amino acid salt. In one embodiment, regenerating the article or amino acid salt comprises heating the article or amino acid salt to a temperature sufficient to remove the acid gas. It should be appreciated that a sufficient temperature to remove the acid gas will depend, in part, on the amount of acid gas that is present. In one embodiment, a sufficient temperature can comprise heating the article or amino acid salt at a temperature in the range of from 60° C. to 150° C., including, for example, temperatures of 80° C., 100° C., 120° C., or 140° C. or above. In another embodiment, the sufficient heating temperature can be in the range derived from these values, including for example, a range from 100° C. to 120° C., or 100° C. to 140° C. Heating of the article or amino acid salt can be achieved by any suitable means, for example, by heating in an oven, or by passing a stream of a heated gas across an external surface of the article or amino acid salt, or through an internal volume of an article.

The amino acid salt may or may not be chemically bound to the substrate. In some embodiments, the amino acid salt coating may be removed from the substrate by any suitable technique, for example, by washing. In some embodiments, the amino acid salt coating is removed from the substrate, allowing the substrate to be recoated with a new amino acid salt solution.

Various embodiments will be further clarified by the following examples.

EXAMPLES

A solution of 20% potassium salt of glycine was prepared by mixing the amino acid glycine and a 45% solution of potassium hydroxide at a molar ratio of 1:1 COOH to OH in water. The pH of the resulting solution was adjusted using KOH solution and/or the amino acid to fall within the range of 8 to 14. Glass wool filter paper was submerged into the potassium salt solution for 10-15 seconds and then dried at room temperature overnight. Before $CO_2$ capture testing the coated glass wool filter paper was dried in an oven with forced air at 100° C. for 15 minutes. The amount of potassium salt of glycine added to the glass wool filter paper was determined by mass difference. To evaluate its ability to capture $CO_2$, the coated glass wool filter paper was placed in a humidified $CO_2$ atmosphere for 30 minutes, with a small back pressure applied. The coated glass wool filter paper was removed and allowed to dry at room temperature overnight. Mass of the coated glass wool filter paper was measured after drying overnight, after drying at 100° C. for 15 minutes and again after drying at 140° C. for 15 minutes. An increase in mass of the glass wool filter paper was observed after exposure to the humidified $CO_2$ atmosphere and even after drying the exposed glass wool filter paper at 100° C. for 15 minutes. A mass decrease was observed after heating the exposed glass wool filter paper at 140° C. for 15 minutes. Control samples were also tested in humidified nitrogen or air atmosphere. No mass change was observed in the control samples.

The above process was repeated using potassium salts of arginine, lysine, and histidine. The $CO_2$ capture and desorption results are summarized in Table 1.

TABLE 1

|  | Potassium salt of arginine | Potassium salt of glycine | Potassium salt of histidine | Potassium salt of lysine |
|---|---|---|---|---|
| % Absorption, RT, moisture saturated $CO_2$ | 29.7 | 30.5 | 24.2 | 29.9 |
| % Desorption, 100° C., 15 min | 8.7 | 1.0 | 1.2 | 8.3 |
| % Desorption, 140° C., 15 min | 23.1 | 20.2 | 14.2 | 33.7 |

A qualitative test was also conducted on the $CO_2$ exposed samples using barium hydroxide, $Ba(OH)_2$. The samples were submerged in water and shaken by hand to dissolve the potassium salts, the resulting solution was clear. A few drops of saturated Ba(OH)$_2$ solution were added to the water containing the sample and a cloudy appearance was observed due to the formation of finely dispersed insoluble BaCO$_3$. The control samples exposed to N$_2$ or air were also tested in the same manner; the water containing the control samples remained clear during this test and did not become cloudy.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. An article comprising: an inorganic substrate; and a particulate solid amino acid salt disposed on the inorganic substrate, wherein the substrate comprises glass wool, and wherein the amino acid salt is derived from glycine, lysine or histidine.

2. The article of claim 1, wherein the amino acid salt is an amino acid potassium salt.

3. The article of claim 1, wherein the amino acid salt is an amino acid sodium salt.

4. The article of claim 1, wherein the amino acid salt is derived from glycine.

5. An article comprising: an inorganic substrate; and a particulate solid amino acid salt disposed on the inorganic substrate, wherein the particulate solid amino acid salt has a mean particle size of $\leq 10$ μm, and wherein the amino acid salt is derived from glycine, lysine or histidine.

6. The article of claim 5, wherein the substrate is in the form of a honeycomb.

7. The article of claim 5, wherein the substrate comprises glass wool.

8. The article of claim 5, wherein the amino acid salt is an amino acid potassium salt.

9. The article of claim 5, wherein the amino acid salt is an amino acid sodium salt.

10. The article of claim 5, wherein the amino acid salt is derived from glycine.

* * * * *